United States Patent [19]

Drew

[11] 4,338,497
[45] Jul. 6, 1982

[54] EXTENSION CORD REEL SET
[75] Inventor: Douglas Drew, Toronto, Canada
[73] Assignee: Noma Canada Ltd., Scarborough, Canada
[21] Appl. No.: 147,359
[22] Filed: May 7, 1980
[51] Int. Cl.³ .......................................... H02G 11/02
[52] U.S. Cl. ................................ 191/12.4; 339/5 RL
[58] Field of Search ...................... 191/12.4, 12.2 R; 339/5 RL, 6 RL, 8 RL

[56] References Cited

U.S. PATENT DOCUMENTS

| | | |
|---|---|---|
| 2,801,303 | 7/1957 | Pailing ............................... 191/12.4 |
| 3,536,275 | 10/1970 | Salomon ....................... 191/12.4 X |
| 3,835,267 | 9/1974 | Sharpe .............................. 191/12.4 |
| 3,837,448 | 9/1974 | Hagstrom ......................... 191/12.4 |

*Primary Examiner*—Richard A. Schacher
*Attorney, Agent, or Firm*—Leon Arthurs; Kenneth M. Garrett

[57] ABSTRACT

The extension cord reel set disclosed is comprised of a reel formed of two symmetrical halves; a housing also formed of two symmetrical shells within which the reel is rotatable and an extension cord having a female outlet molded onto one of its ends with all of the live elements embedded in the molding material; said outlet being trapped in operative position between the two halves of the reel which are then combined to complete the reel which is enclosed within the housing shells.

5 Claims, 7 Drawing Figures

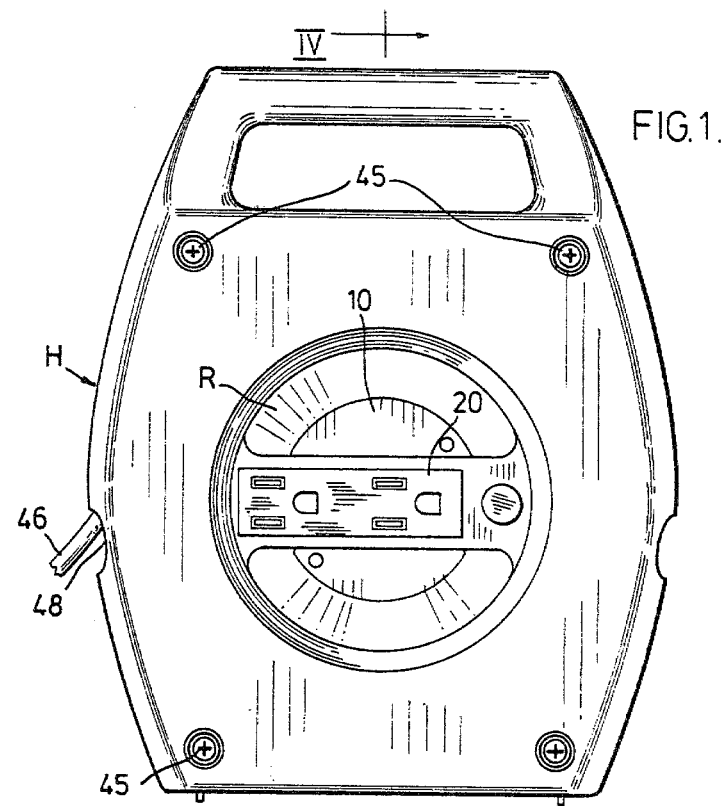
FIG.1.
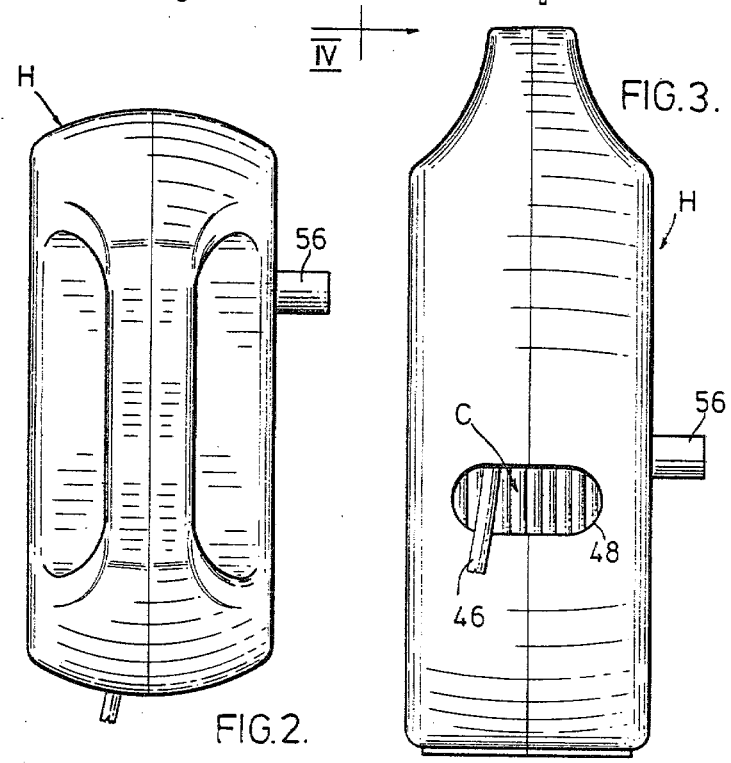
FIG.2.
FIG.3.

EXTENSION CORD REEL SET

FIELD OF THE INVENTION

The invention relates to an extension cord associated with a reel upon which the cord may be coiled for storage and from which greater or lesser lengths thereof may be uncoiled for use; the reel being contained and rotatable in a housing to recoil the cord as may be required. One end of the cord is fitted with an electrical connector—usually a female outlet—at the reel and its opposite end emerging from the housing is fitted with a counterpart connector—e.g. a male plug.

BACKGROUND OF THE INVENTION

The concept of cord reels is not new and, in fact, various unofficial and official specifications relating thereto are current—for example, Underwriter Laboratory specification UL 335. One common objection to prior devices which the present invention seeks to overcome is the fact that in the known prior devices, the wiring connecting the cord to the outlet at the reel was "open"—i.e. uninsulated—and effected in a conventional manner as by screwing bared pig-tails of the cord conductors to the exposed terminal posts of the outlet.

Presumably, this practice was tolerated because the described connections were effected within a housing in which they would be shielded against outside access.

However, the housing did not protect them against humidity or even rain water which was able to seep into the housing and so tended to limit the situations in which the devices could be safely used. Moreover, the flexing of the cord as it was being uncoiled from the recoiled on the reel tended to fatigue the pig-tails attaching the cords to the connectors thereby weakening and ultimately breaking these attachments.

BRIEF DESCRIPTION OF THE INVENTION

The invention seeks to overcome these and other objections to the prior art by the provision of a construction which totally eliminates uninsulated live spots within the housing and which, moreover, lends itself to rapid and efficient production of extension cord reels as herein visualized.

More specifically, the invention avails itself of an extension cord having an electrical connector molded onto one end thereof with all of its live elements embedded in the molding material except, of course, for the slots providing access to the terminals in the interior of the connector. Such connector, or outlet, as it is commonly known, is trapped between two halves of the reel so as to assume a somewhat diametrical position across the reel hub with appropriate exposure for interconnection with couterpart male connectors; the reel being of course, rotatably mounted in a housing with a suitable aperture through which said outlet is accessible.

One feature of the invention which is especially noteworthy is the simplicity of construction and the ease with which the present cord reel is assembled as will appear.

BRIEF DESCRIPTION OF THE DRAWINGS

Other objects and advantages of the invention will be apparent from the hereinafter following description thereof when read in conjunction with the appended drawing illustrating by way of example only a preferred embodiment of the invention wherein:

FIGS. 1, 2 and 3 are, respectively, front, plan and side elevations of an extension cord reel according to the invention;

Figure 4:
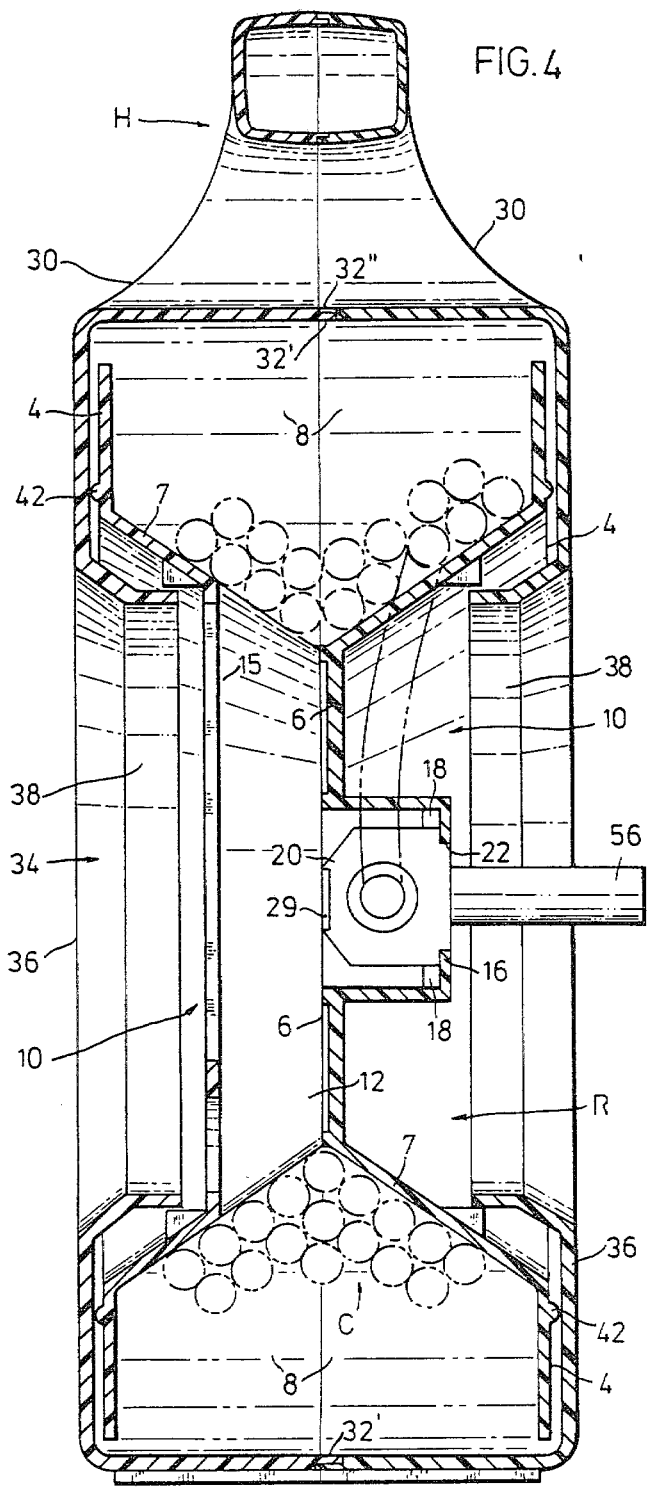
FIG. 4 is a section along the line IV—IV of FIG. 1.

As will be apparent from the drawing, the invention comprises three main subassemblies, namely: flexible cord C, reel R on which cord C is coilable as described, and housing H which contains reel R.

It will be further noted that reel R and housing H are respectively formed of substantially indentical halves, to be more particularly described, and that cord C is fitted with an electrical outlet molded onto one of its ends with all of its live elements embedded within the molding material.

In general appearance, each reel half 2 resembles a truncated horn with a relatively wide rim 4 at its major diameter, a floor 6 at its minor diameter and a sloping wall 7 between them.

Figure 5:
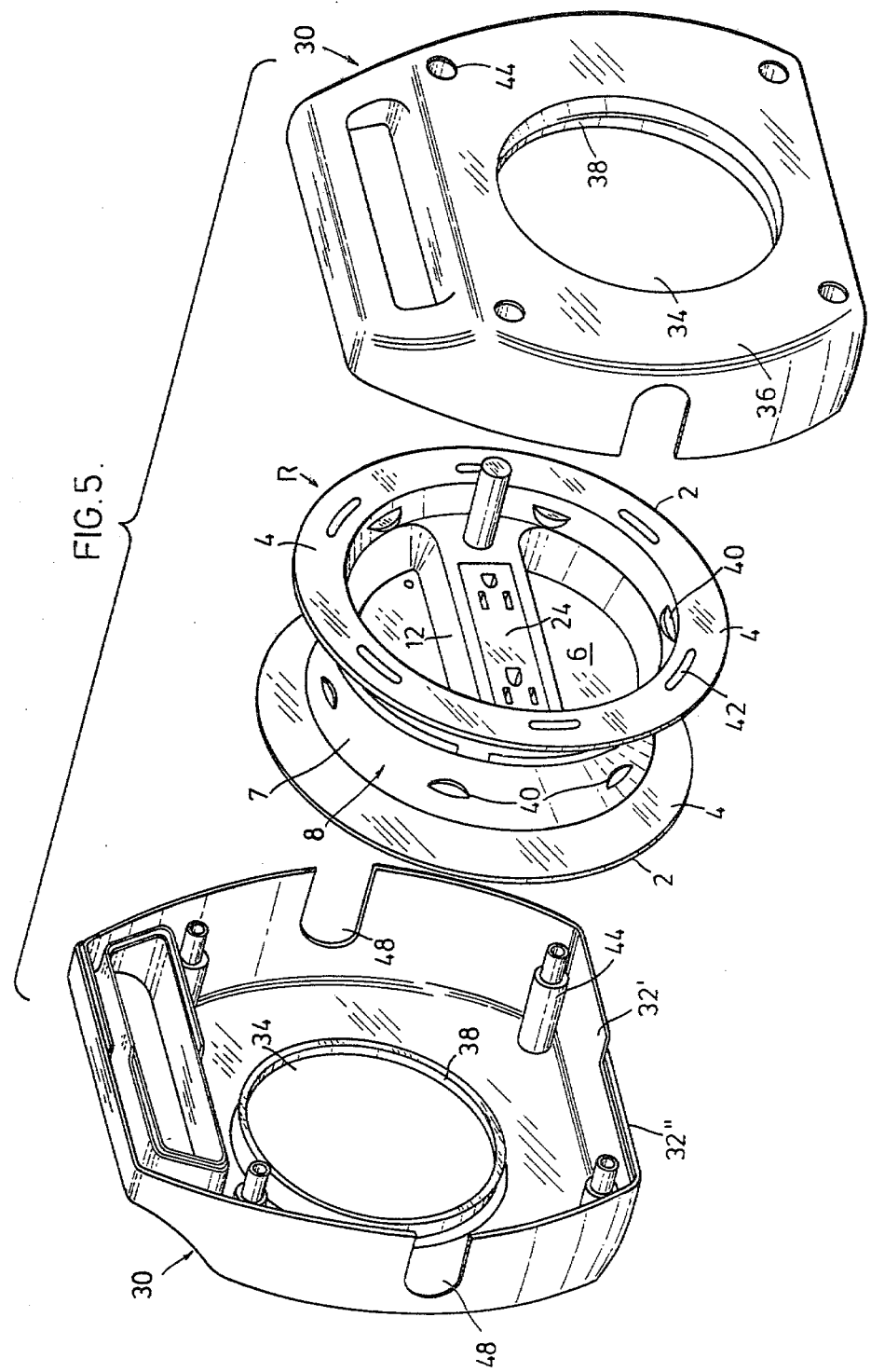
FIG. 5 is an exploded isometric view of the instant cord reel with the cord removed.

In assembly with each other, the floors 6-6 of the two reel halves 2-2 are disposed in back-to-back relation whereby the thus assembled reel R develops a wide and deep peripheral V-groove 8 between its outer periphery and hub 10 providing accommodation for the coiled extension cord C as will be obvious from FIGS. 4 and 5.

Floor 6 of each reel half 2 includes an embossment forming a central channel 12, which spans hub 10 and has an intermediate slot 14 in its web 15 with mutually confronting edge lips 16-16 having depending dentils 18.

Figure 6:
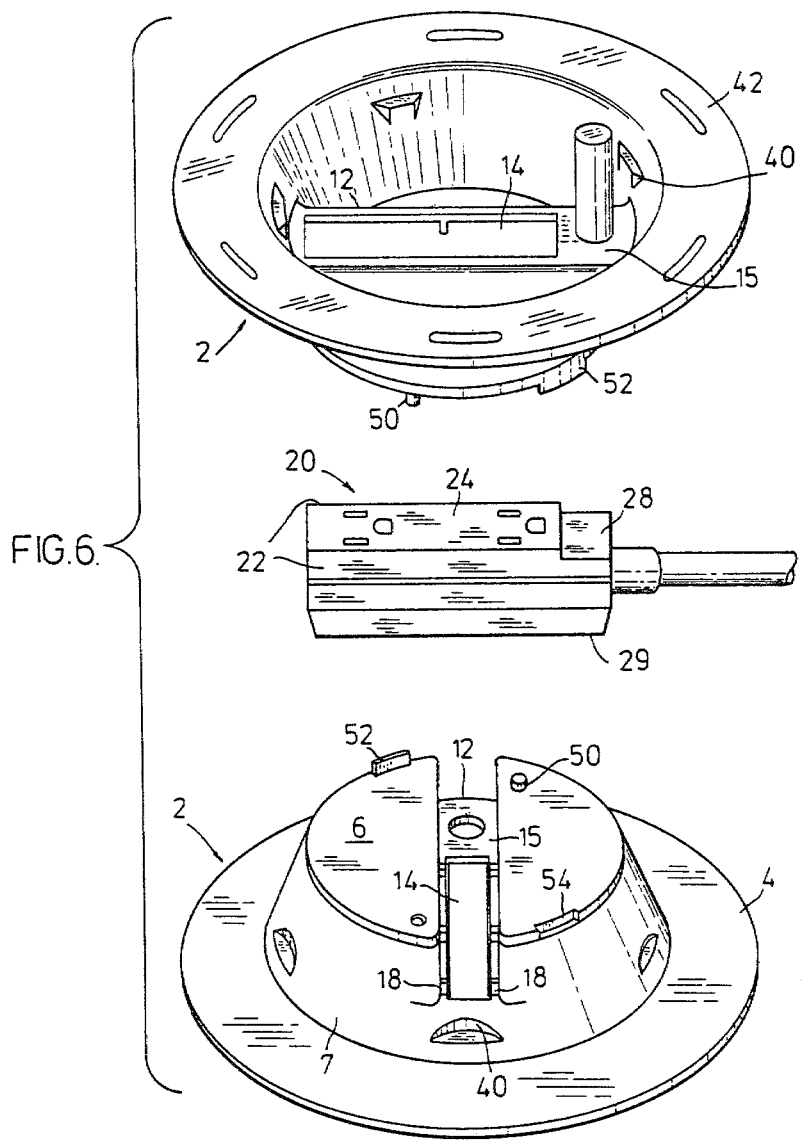
FIG. 6 is an exploded isometric view of the reel illustrated in FIG. 5.

Attention is now directed to the end elevational view of outlet 20 provided by FIG. 4 and the more or less side elevational view thereof provided by FIG. 6.

As will be observed, the edges 22-22 of outlet 20 at its face 24 are rabbeted to accommodate lips 16-16 of slot 14 permitting outlet 20 to sit snuggly inside hollow channel 12 with its face 24 framed within channel slot 14 and lips 16-16 in the rabbetted edges 22-22.

It will be noted further that a shallow depression 28 is formed in face 24 of outlet 20 and this underlies channel web 15 at one end of slot 14.

The proportions of the outlet 20 are such that when it is seated in channel 12 in the described manner its back 29 will be engaged and clamped by the floor 6 of the counterpart reel half 2 which is turned so that the respective channels 12-12 of the two reel halves 2-2 are disposed in angular relation to each other.

The channels 12-12 are open at each end whereby when outlet 20 is seated within one such channel 12 its cord C will pass freely therefrom into peripheral groove 8.

Housing H within which reel R is accommodated is formed, as well, of two shells 30-30 which are substantially indentical so that a description of one will suffice in general, for both of them.

Each shell has an inner lap 32' formed along one half of its periphery and an outer lap 32" formed along the other half whereby two shells 30-30 are enabled to nest together in assembly; each being partially overlapped by the other.

Each shell 30 also has a fairly large, rounded window 34 centred on its front wall 36 with a perimetrical, inturned, skirting 38 so disposed and proportioned that when the shells 30-30 are assembled to form housing H for reel R, said skirting 38 will reach to the sloping wall 7 of the proximal reel half 2; there being a ring of discrete embossments 40 formed on said sloping wall 7 disposed to surround the skirting 38 in such assembly and co-operate therewith to provide bearings upon which the reel R is centred and rotatable within housing H.

Anti-friction spacers 42 will also be seen to be embossed on rim 4 of each reel half 2.

Hollow posts 44, provided on the interior of each housing shell 30 confront corresponding posts 44 in the other shell 30 of housing H for the accommodation of screws 45 joining together shells 30-30 in a manner which will be obvious and well understood.

Egress for the free end 46 of flexible cord C from housing H is provided by opening 48.

Figure 7:
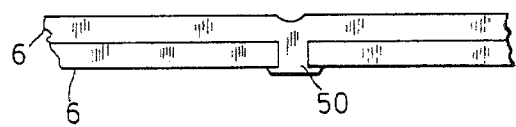
FIG. 7 is a cross sectional view of a detail of the invention.

To assemble flexible cord C, reel halves 2-2 and housing shells 30-30 into an extension cord reel as herein visualized, outlet 20 is seated in channel 12 of one reel half 2 in the manner described and illustrated in the drawing. The second reel half 2 is then superposed thereover—i.e. with the floors 6-6 of the two reel halves 2-2 in angularly displaced back-to-back relation—in which position they are secured together, for example, by fasteners such as rivets 50-50 which may be integral with reel halves 2-2 as shown in FIG. 7. This ensures that outlet 20 will now be held more or less immovably within channel 12 and with its face 24 exposed to receive counterpart connectors (not shown). Suitable angular displacement of the two reel halves 2-2 may be ensured by the provision of a tenon 52 projecting rearwardly from the floor each reel half 2 and a mortise 54 formed opposite it at the respective ends of a diameter of the floor 6 which is at a diagonal to channel 12. The tenon 52 of each reel half 2 will thus fit into the mortise 54 of the other, disposing the respective channels 12-12 in angular relation to each other so that outlet 20 seated in one of them will be clamped therein by the overlying reel half 2.

The reel R being thus assembled it is then enclosed within shells 30-30; care being taken to ensure that skirting 38 of each housing shell 30 is embraced and ringed by embossments 40, and that the respective laps 32', 32" of each shell 30 overlap and are overlapped by their counterparts in the other shell 30. This being done, the four corner posts 44 of each shell 30 align axially with their opposite numbers in the other shell 30 after which four screws 45 join the four pairs of aligned corner posts 45 securing the entire assembly of cord, reel and housing.

As will be apparent from the drawing, the shells 30-30 may also be shaped to provide a handle for the instant extension cord reel and an arm 56 provided on one of the reel halves 2 for cranking the reel R within housing H to recoil flexible cord C on reel R.

While the foregoing describes the best form of the invention presently known to the inventor, it will be understood that the invention is capable of modification to adapt it to different situations and it is therefore emphasized that the scope of the invention be as limited by the following claims only:

I claim:

1. A reel-type extension cord set, comprising:
a flexible extension cord having an electrical outlet molded onto one end thereof with all of its live elements embedded in the molding material;
a reel having a wide and deep peripheral groove within which said extension cord is coilable;
a housing for said reel within which it is rotatable for uncoiling and recoiling said extension cord and having an opening through which said extension cord is withdrawable for use;
a hub forming part of said reel having a compartment within which said outlet is captured and substantially contained against movement; the housing having a window affording use access to said outlet within said compartment;
said reel comprising two components with formations cooperating to provide said compartment and contain the outlet therein, and
one formation in one of said components comprising a channel within which the outlet is seatable; the other component having a floor disposed over said channel and barring it to prevent withdrawal of said outlet therefrom.

2. A reel-type extension cord set as set forth in claim 1, wherein the peripheral groove of the reel is defined by spaced rims surrounding and extending radially from said hub; said housing and the rims having formations co-operating with each other for positioning the reel within the housing and for providing bearing elements upon which the reel is rotatable.

3. A reel type extension cord set comprising:
a flexible extension cord having an electrical connector molded onto one end thereof with all of its live elements embedded in molding material;
a reel having a wide and deep peripheral groove within which said extension cord is coilable;
a housing for said reel within which it is rotatable for uncoiling and recoiling said extension cord and having an opening through which said extension cord is withdrawable for use; and
a hub forming part of said reel, said hub comprising two components, one said component having a channel therein within which said connector is seatable, the other said component having a floor therein, said channel and floor combining to form a compartment within which said connector is captured and substantially contained against movement; the housing having a window opening therein affording access to said connector.

4. A reel-type extension cord set as set forth in claims 1, 2 or 3, wherein said reel components are substantially identical and constitute two halves of the reel.

5. A reel-type extension cord as defined in claims 1, 2 or 3 wherein said housing comprises two substantially identical halves.

* * * * *